May 2, 1967 W. H. CONE 3,317,765
COMBINATION VEHICLE MOTOR AND ELECTRICAL POWER UNIT
Filed April 20, 1964 2 Sheets-Sheet 1
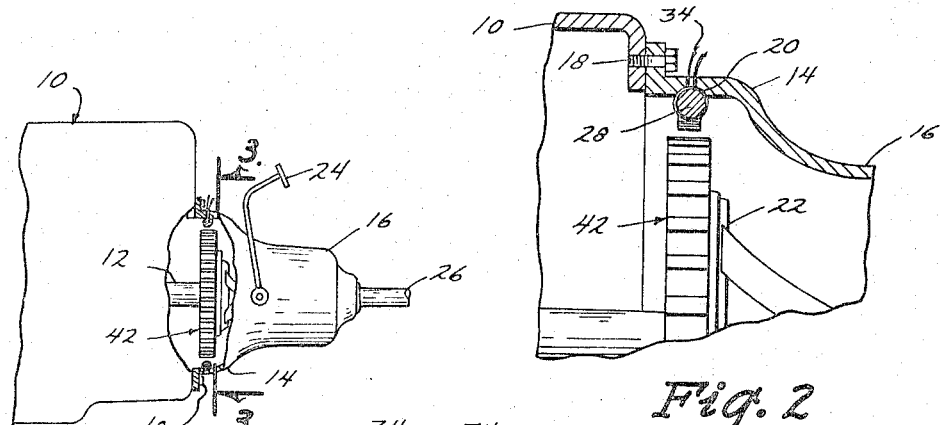
Fig. 1
Fig. 2
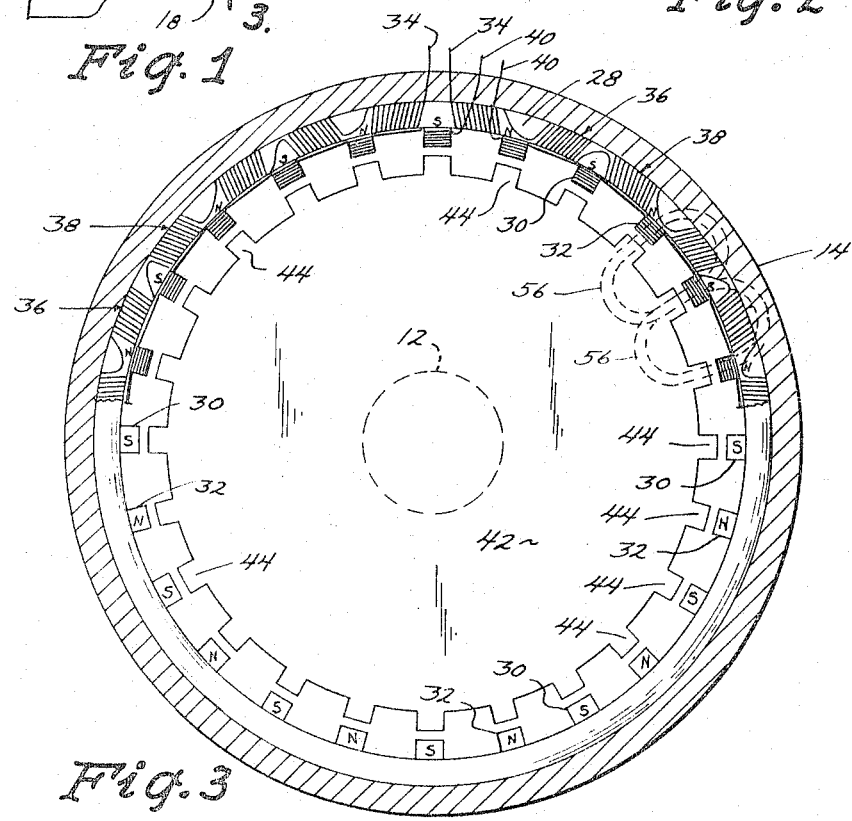
Fig. 3
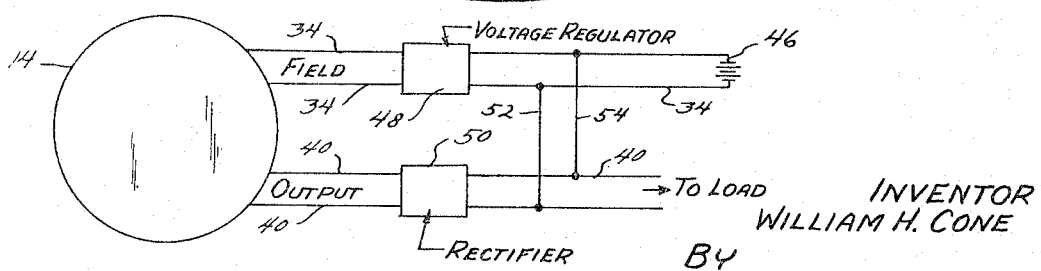
Fig. 4
INVENTOR
WILLIAM H. CONE
BY
Dick & Zarley
ATTORNEYS INVENTOR
WILLIAM H. CONE
BY
Dick & Farley
ATTORNEYS

United States Patent Office 3,317,765
Patented May 2, 1967

3,317,765
COMBINATION VEHICLE MOTOR AND
ELECTRICAL POWER UNIT
William H. Cone, 3177 Golfing Green Drive,
Dallas, Tex. 75234
Filed Apr. 20, 1964, Ser. No. 361,193
4 Claims. (Cl. 310—74)

Each year finds that more and more demands are being made on the motors of trucks, and automobiles for the generation of electrical power to serve air conditioning, refrigeration, and other power-consuming equipment. Generators and alternators place additional operating loads on the vehicle motor and consume valuable space. They are ordinarily powered by means of belts operating from a motor drive shaft, and the belts themselves create a maintenance problem. The powering of these units by the motor is often damaging to the engine crankshaft and main bearing.

Therefore, a principal object of this invention is to provide a combination vehicle motor and electrical power unit which can provide electrical power through the substitution of an alternator rotor for the usual engine flywheel and the addition of field windings within the usual flywheel housing.

A further object of this invention is to provide a combination vehicle motor and electrical power unit which will not add to the space requirements for the usual engine.

A still further object of this invention is to provide a combination vehicle motor and electrical power unit which will not add to the wear on the engine crankshaft and main bearing.

A still further object of this invention is to provide a combination vehicle motor and electrical power unit which will require no special gears.

A still further object of this invention is to provide a combination vehicle motor and electrical power unit which can be incorporated on any engine without interfering with the usual engine components.

A still further object of this invention is to provide a combination vehicle motor and electrical power unit which eliminates the need for special mounts, pulleys, belt tighteners, idlers and the like.

A still further object of this invention is to provide a combination vehicle motor and electrical power unit that requires no lubrication.

A still further object of this invention is to provide a combination vehicle motor and electrical power unit which creates a much higher power output at any engine speed and an adequate power output even at low engine speeds.

A still further object of this invention is to provide a combination vehicle motor and electrical power unit not easily subject to damage or malfunction and which is protected from the elements.

A still further object of this invention is to provide a combination vehicle motor and electrical power unit that adds no new moving parts to the engine.

A still further object of this invention is to provide a combination vehicle motor and electrical power unit that is economical in manufacture and durable in use.

These and other objects will be apparent to those skilled in the art.

This invention consists in the construction, arrangements, and combination, of the various parts of the device, whereby the objects contemplated are attained as hereinafter more fully set forth, specifically pointed out in the claims, and illustrated in the accompanying drawings, in which:

FIGURE 1 is a side elevational view of the device of this invention with portions thereof cut away to more fully illustrate its construction;

FIGURE 2 is an enlarged sectional view of that portion of FIGURE 1 where the flywheel housing is secured to the vehicle motor;

FIGURE 3 is an enlarged sectional view of the device of this invention taken on line 3—3 of FIGURE 1;

FIGURE 4 is a block diagram schematically showing the circuitry of the device of FIGURES 1 through 3;

Figure 5:
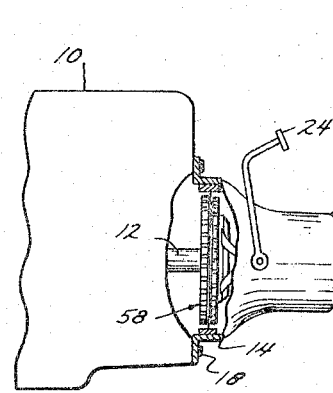
FIGURE 5 is a sectional view similar to that of FIGURE 1 but shows an alternate form of the invention.
Figure 6:
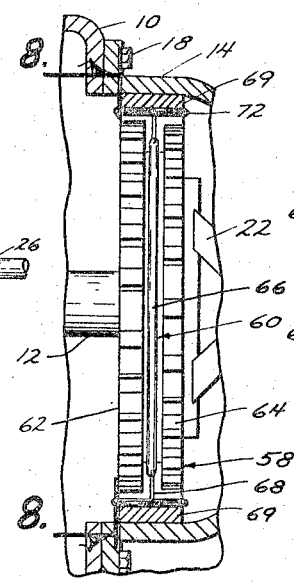
FIGURE 6 is an enlarged sectional view of the flywheel housing shown in FIGURE 7.
Figure 7:
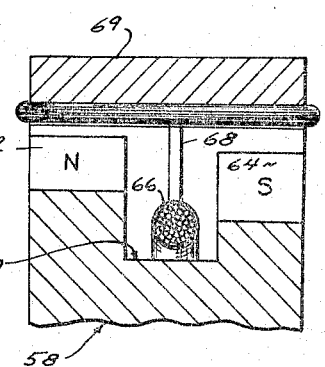
FIGURE 7 is an enlarged vertical sectional view taken at the top portion of the rotor of FIGURE 6.

The numeral 10 generally designates a vehicle engine with a horizontally and outwardly extending drive shaft 12 which terminates within flywheel housing 14. The flywheel housing can be integral with transmission housing 16 or can be of separate construction. The flywheel and transmission housings are secured to the engine block by means of bolts 18. An annular recess 20 appears in the flywheel housing 14. The transmission housing 16 includes the usual clutch plate elements 22 which are operatively connected in the typical manner to clutch pedal 24. Drive shaft 26, which is operatively connected in conventional fashion to components within the transmission housing 16, extends horizontally outwardly from one end of the transmission housing. The foregoing components are typical of most vehicles and do not of themselves comprise the essence of this invention.

A circular stator element 28 comprised of laminations of any suitable core material, such as low carbon, high silicon iron, is mounted in the groove 20 of flywheel housing 14. The laminations are varnished to insulate themselves from each other. A plurality of equally spaced apart inwardly extending teeth elements 30 and 32 are located on the inner periphery of stator element. Electroconducting lead 34 extends through a suitable opening in the flywheel housing 14 (FIGURE 2) and is wound in increments around the stator element 28 in between pairs of teeth elements 30 and 32. As shown in FIGURE 3, the direction of the windings is reversed on opposite sides of each of the teeth elements so that as current passes successively through the oppositely wound field coil segments 36 and 38, the polarity of alternate teeth is reversed, thus giving teeth elements 30 and 32 the polarity indicated in FIGURE 3. It will be noted that all of the field coil segments 36 and 38 are connected in series by the continuous lead 34, the "outlet" end of which exits the flywheel housing through the same opening through which it entered.

Electro conducting lead 40 enters the flywheel housing through a suitable opening (FIGURE 2) and is successively wound around the teeth elements 30 and 32 to create the output windings, which are therefore series connected.

A rotor 42 with a plurality of radially extending teeth or inductor elements 44 is rigidly secured to shaft 12 within flywheel housing 14. The rotor 42 is comprised of steel or the like and preferably has the same number of inductors as there are teeth 30 and 32 on stator 28.

As indicated in FIGURE 4, the field windings are connected by leads 34 to the vehicle battery 46, and voltage regulator 48 is imposed within leads 34. The output windings on teeth elements 30 and 32 are connected by leads 40 to the load, which could be a truck refrigeration unit, for example, and rectifier 50 is imposed in the output lines. Leads 52 and 54 interconnect the input and output lines to relieve the battery 46 after the unit has started to function.

After the vehicle motor is started, shaft 12 rotates in the usual manner. Field windings 36 and 38 are energized by battery 46 upon the closing of an appropriate switch (not shown). Self-excitation residual can be obtained through residual magnetism in the rotor, or permanent magnets installed on the rotor could be used for this same purpose. The regulated flow of D.C. current through the field windings 36 and 38 creates the magnetic fields which are typically shown by the dotted lines in FIGURE 3, and which are designated by the numeral 56. The rotation of the flywheel or rotor 42 causes the teeth or inductors 44 to vary the permeance of the magnetic circuit, and this variation in flux induces an alternating E.M.F. in the output coils on teeth 30 and 32 of the stator, which delivers single phase power to the rectifier 50.

A three-phase output is provided by the device shown in FIGURES 5 through 11. A rotor 58 is mounted on shaft 12 within the flywheel housing 14. Rotor 58 is comprised of an electro-conducting material and has a center portion 60 of decreased diameter, with radially extending spaced apart teeth 62 on one end and similar teeth 64 on the other end. The teeth 64 are out of phase with the teeth 62 so that one pole or tooth will head the other as the rotor rotates.

Figure 8:
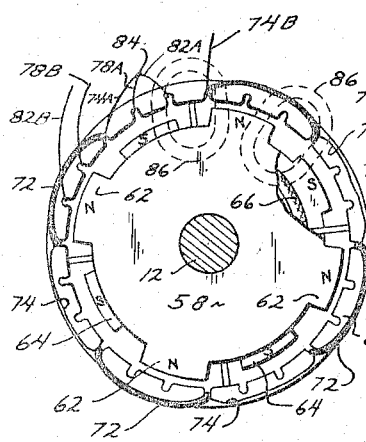
FIGURE 8 is a reduced scale sectional view of the device of this invention taken on line 8—8 of FIGURE 6. This view shows only one portion of the field windings on the device of FIGURE 8.
Figure 9:
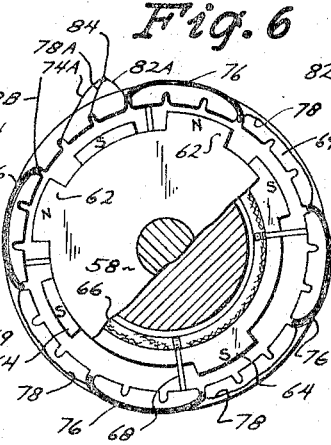
FIGURES 9 and 10 are sectional views similar to that of FIGURE 8 but show separately the two remaining field windings on the device of FIGURE 6.
Figure 10:
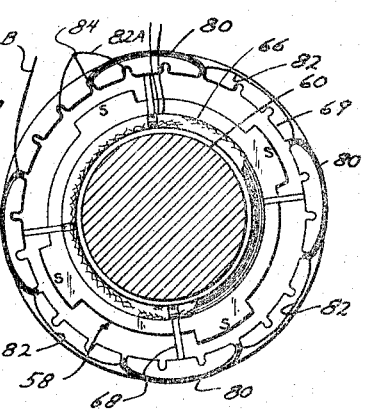
Figure 11:
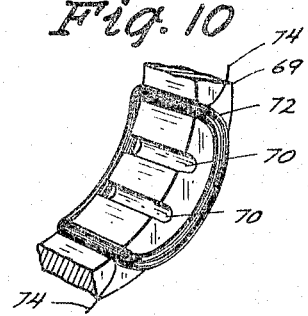
FIGURE 11 is a partial perspective view of the flywheel housing of FIGURE 6 with one of the field winding coils mounted thereon.

The field winding coil 66 is suspended in spaced relation to the center portion 60 of rotor 58 by rods 68 which extend inwardly from flywheel housing 14. The inner periphery of the housing 14 includes a stator ring 69 having a plurality of transverse grooves 70. Rectangularly disposed output coils 72 have their end portions disposed in every third groove 70 as indicated in FIGURES 8 and 11. Each of the coils 72 are electrically connected together in series by leads 74. Coils 76 are identical to coils 72 but are positioned at adjacent pairs of grooves 70 (FIGURE 9). Coils 76 are series connected by leads 78. Similarly, output coils 80 are positioned at the remaining pairs of grooves 70 (FIGURE 10) and are interconnected by leads 82. The endmost leads 74A, 78A and 82A are interconnected at 84 to create a Y-connected output. The opposite endmost leads 74B, 78B and 82B then extend through a convenient opening in flywheel housing 14 to the load.

The energization of the field coil 66 creates the magnetic circuit 86 shown by the dotted lines in FIGURE 8. As the rotor 58 is rotated, the teeth or inductors 62 and 64 vary the permeance of the magnetic circuit, and this variation in flux induces an alternating E.M.F. in each of the output coils 72, 76 and 80, which results in a three-phase output.

It will be understood that the device of this invention can utilize either the conventional flywheel 42 or the specially fabricated unit 58 as its rotor. In addition, the field windings can either be made as an integral part of the flywheel housing, or it can be constructed within the conventional flywheel housing.

From the foregoing, it is seen that the flywheel and flywheel housing of the typical vehicle engine can be adapted to provide an auxiliary source of electrical power in an economical and convenient manner, whereupon at least the stated objectives of this invention are met.

Some changes may be made in the construction and arrangement of my combination vehicle motor and electrical power unit without departing from the real spirit and purpose of my invention, and it is my intention to cover by my claims, any modified forms of structure or use of mechanical equivalents which may be reasonably included within their scope.

I claim:
1. In combination with a vehicle engine having a block, a flywheel housing, and a rotatable driveshaft extending from the block into said flywheel housing,
   electrical field windings mounted on the inner periphery of said flywheel housing and adapted to be connected to a source of electrical energy, and adapted to create a magnetic field upon being connected to said source,
   output windings in said magnetic field mounted on the inner periphery of the flywheel housing and adapted to be connected to an electrical load,
   a flywheel rotor rigidly secured to said driveshaft within said flywheel housing, a vehicle transmission operatively secured to said flywheel rotor,
   said flywheel rotor including a plurality of spaced apart teeth on the periphery of the rotor whereby the rotation of said rotor by said driveshaft will cause said teeth to vary the permeance of said magnetic field to induce an alternating electromotive force in said output windings; said flywheel being entirely free from engagement with any electrical windings.

2. The combination of claim 1 wherein said field windings and said output windings are wound on a stator core within said flywheel housing, said stator core including a circular core with inwardly extending spaced apart teeth secured thereto, said field windings being wound on said circular core inbetween said spaced apart teeth, and said output windings being wound on said teeth.

3. The combination of claim 1 wherein said field windings and said output windings are wound on a stator core within said flywheel housing, said stator core including a circular core with inwardly extending spaced apart teeth secured thereto, said field windings being wound on said circular core inbetween said spaced apart teeth, and said output windings being wound on said teeth; said field windings being electrically connected in series, and said output windings being electrically connected in series.

4. The combination of claim 1 wherein said field windings and said output windings are wound on a stator core within said flywheel housing, said stator core including a circular core with inwardly extending spaced apart teeth secured thereto, said field windings being wound on said circular core inbetween said spaced apart teeth, and said output windings being wound on said teeth; the direction of the field windings being reversed on opposite sides of each of said teeth to reverse the polarity of each successive tooth.

References Cited by the Examiner

UNITED STATES PATENTS

| | | | |
|---|---|---|---|
| 1,511,492 | 10/1924 | Aspden | 310—74 |
| 2,045,197 | 6/1936 | Neuland | 318—150 |
| 2,320,721 | 6/1943 | Ericsom | 310—74 |
| 2,505,130 | 4/1950 | Maynard | 310—155 |
| 2,718,603 | 8/1955 | McLean | 310—155 |
| 3,157,810 | 11/1964 | Adkins | 310—168 |
| 3,179,825 | 4/1965 | Terry et al. | 310—168 |
| 3,193,713 | 6/1965 | Larson et al. | 310—74 |

FOREIGN PATENTS

| | | |
|---|---|---|
| 705,933 | 4/1952 | Great Britain. |
| 789,031 | 1/1958 | Great Britain. |

MILTON O. HIRSHFIELD, *Primary Examiner.*

J. D. MILLER, *Assistant Examiner.*